United States Patent
Lalonde

(10) Patent No.: US 8,103,164 B2
(45) Date of Patent: *Jan. 24, 2012

(54) HIGH FREQUENCY NOISE MEASUREMENT BOARD

(75) Inventor: André Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 11/214,414

(22) Filed: Aug. 29, 2005

(65) Prior Publication Data

US 2006/0045459 A1 Mar. 2, 2006

Related U.S. Application Data

(60) Provisional application No. 60/606,076, filed on Aug. 31, 2004.

(51) Int. Cl.
*H04B 10/08* (2006.01)
(52) U.S. Cl. ............ 398/23; 398/24; 398/25; 398/22; 398/140
(58) Field of Classification Search .......... 398/9, 22–25, 398/140, 182, 202; 385/147
See application file for complete search history.

(56) References Cited

U.S. PATENT DOCUMENTS

| | | | | |
|---|---|---|---|---|
| 3,878,723 A * | 4/1975 | Blalock et al. | ................. | 374/175 |
| 4,019,066 A * | 4/1977 | Lucas et al. | ............. | 250/559.16 |
| 4,236,256 A * | 11/1980 | Brackett et al. | ............... | 398/209 |
| 4,990,895 A * | 2/1991 | Juds | ............... | 340/635 |
| 4,999,895 A * | 3/1991 | Hirose et al. | ................... | 29/33 P |
| 5,144,226 A * | 9/1992 | Rapp | ............................. | 324/132 |
| 5,365,055 A * | 11/1994 | Decker et al. | ............. | 250/214 R |
| 5,534,996 A * | 7/1996 | Mori et al. | ..................... | 356/218 |
| 5,548,399 A | 8/1996 | Takai et al. | | |
| 5,550,747 A * | 8/1996 | Newman, Jr. | ................... | 702/76 |
| 5,618,495 A * | 4/1997 | Mount et al. | ............... | 422/82.05 |
| 6,064,507 A * | 5/2000 | Heflinger et al. | ............. | 359/237 |
| 6,411,323 B1 * | 6/2002 | Waarts et al. | ................... | 347/241 |
| 6,724,179 B2 * | 4/2004 | Kingsley et al. | ................. | 324/96 |
| 6,771,904 B1 * | 8/2004 | Sasaki et al. | .................... | 398/25 |
| 7,129,689 B2 * | 10/2006 | Lalonde | .................... | 324/76.11 |
| 7,295,585 B2 * | 11/2007 | Sandberg et al. | ............... | 372/31 |
| 7,414,386 B2 * | 8/2008 | Lalonde | .................... | 324/76.11 |
| 7,777,477 B2 * | 8/2010 | Takada | ........................ | 324/76.11 |
| 7,885,540 B2 * | 2/2011 | DeCusatis et al. | ............... | 398/25 |

(Continued)

OTHER PUBLICATIONS

Analog Devices, "LF to 2.5 GHz TruPwr Detector," 2001.

(Continued)

*Primary Examiner* — Kenneth N Vanderpuye
*Assistant Examiner* — Hibret Woldekidan
(74) *Attorney, Agent, or Firm* — Maschoff Gilmore & Israelsen

(57) ABSTRACT

Optical test apparatus. A test apparatus for testing transmitter or receiver devices. The test apparatus includes a transmitter source configured to connect to an optical transmitter. A wide band, wide area optical detector is adapted to optically couple to the optical transmitter powered by the transmitter source. A filter is connected to the optical detector. The filter is configured to separate AC and DC portions of a signal received from the optical detector. A true RMS converter is connected to the filter. The filter is configured to convert an AC noise signal received from the filter to a function of an RMS value of the AC noise signal received from the optical detector. A data acquisition system is connected to the true RMS converter. The data acquisition system is configured to characterize noise characteristics of the transmitter source.

20 Claims, 2 Drawing Sheets

U.S. PATENT DOCUMENTS

| | | | |
|---|---|---|---|
| 2003/0042844 A1* | 3/2003 | Matsumura et al. | 313/498 |
| 2003/0042884 A1* | 3/2003 | Kingsley et al. | 324/96 |
| 2004/0101007 A1* | 5/2004 | Bozso et al. | 372/38.02 |
| 2006/0222370 A1* | 10/2006 | DeCusatis et al. | 398/135 |
| 2006/0233546 A1* | 10/2006 | Lalonde | 398/9 |

OTHER PUBLICATIONS

U.S. Appl. No. 11/103,766, filed Apr. 12, 2005, Lalonde.

* cited by examiner

HIGH FREQUENCY NOISE MEASUREMENT BOARD

CROSS-REFERENCE TO RELATED APPLICATIONS

This application claims the benefit of U.S. Provisional Application No. 60/606,076, titled "High Frequency Noise Measurement Board" filed Aug. 31, 2004, which is incorporated herein by reference.

BACKGROUND OF THE INVENTION

1. The Field of the Invention

The invention generally relates to fiber-optic test equipment. More specifically, the invention relates to test equipment for testing optical transmitters used in fiber-optic communications.

2. Description of the Related Art

Fiber-optic networking can be used to communicate in modern high-speed networks. To transmit data on a fiber-optic network, the data is converted from an electronic signal to an optical signal. This conversion may be done, for example, by using a transmitter or transmitting optical sub-assembly (TOSA). The transmitters and TOSAs often include light generating devices such as a laser or light emitting diode (LED). The light generating device is modulated according to digital data to produce a modulated optical signal.

When optical signals are received, those optical signals are generally converted to an electronic signal. This is often accomplished using a receiver or a receiver optical subassembly (ROSA). Receivers and ROSAs generally include a photo sensitive device such as a photodiode connected to a transimpedance amplifier (TIA). When a modulated optical signal impinges the photo sensitive device, a modulated current is induced in the photo sensitive device. This current can be converted by the TIA to an electronic signal usable by digital devices on a network.

Manufacturers of ROSAs and TOSAs typically perform various performance tests on the ROSAs and TOSAs before they are delivered to distributors and end customers. This performance testing can be used to detect defects or to sort components into groups of different rated values.

More particularly, testing directed towards the ROSA may include testing the responsivity of the ROSA to a modulated optical signal, testing the amount of current produced for a given amount of optical signal and so forth. Testing responsivity includes comparing a modulated optical signal input into the ROSA to an AC electrical signal produced by the ROSA as a result of receiving the AC optical signal.

Testing may be performed on the TOSA to characterize operating characteristics of the TOSA. One test that may be performed includes plotting the amount of optical energy produced by the TOSA as a function of the amount of current and voltage used to drive the TOSA. An LIV (light intensity, current, voltage) curve is one way of graphically illustrating the characteristics of a TOSA or laser or LED source. Another test includes measuring the amount of noise produced by the TOSA.

Many of these tests have conventionally been performed using expensive high-frequency test equipment. For example, some tests use a high frequency communications analyzer costing in the tens of thousands of dollars. Further, many of these test devices are general-purpose test devices. As such, these general purpose devices require significant amounts of human interaction to configure for testing a particular component. This increases the test times for each component. When a number of components are tested, the amount of manpower and equipment to process testing of the components also quickly increases. Thus, testing components, for example, ROSAs and TOSAs, is time consuming and requires properly configured equipment.

Additionally, testing is often not repeatable from part to part. This is due to the changing nature of cables and the like associated with general purpose test equipment. Accordingly, what would be advantageous are more efficient mechanisms for testing optical components.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

BRIEF SUMMARY OF THE INVENTION

One embodiment includes a test apparatus for testing transmitter devices. The test apparatus includes a transmitter source adapted to connect to an optical transmitter. A wide band, wide area optical detector is adapted to optically couple to the optical transmitter powered by the transmitter source. A filter is connected to the optical detector. The filter is adapted to separate AC and DC portions of a signal received from the optical detector. A true RMS converter is connected to the filter. The filter is configured to convert an AC noise signal received from the filter to a function of an RMS value of the AC noise signal received from the optical detector. A data acquisition system is connected to the true RMS converter. The data acquisition system is configured to characterize noise characteristics of the transmitter source.

Another embodiment includes a method of testing transmitter devices. The method comprising includes supplying DC current or voltage to the transmitter device. Power output is detected from the transmitter device. AC and DC portions of a signal received as a result of detecting power output from the transmitter device are filtered. An AC noise signal received as a result of filtering is converted to a function of an RMS value of the AC noise signal. The AC noise signal is provided to a data acquisition system.

Yet another embodiment includes a test apparatus for testing detector devices. The test apparatus includes an optical transmitter. A test fixture is included in the test apparatus and is configured to receive an optical detector to optically couple the optical transmitter to the optical detector. A filter is configured to connect to the optical detector. The filter is configured to separate AC and DC portions of a signal received from the optical detector. A true RMS converter is connected to the filter. The true RMS converter is configured to convert an AC noise signal received from the filter to a function of an RMS value of the AC noise signal received from the optical detector. A data acquisition system is connected to the true RMS converter. The data acquisition system is configured to characterize the noise characteristics of the transmitter source.

DETAILED DESCRIPTION OF THE INVENTION

Figure 1:
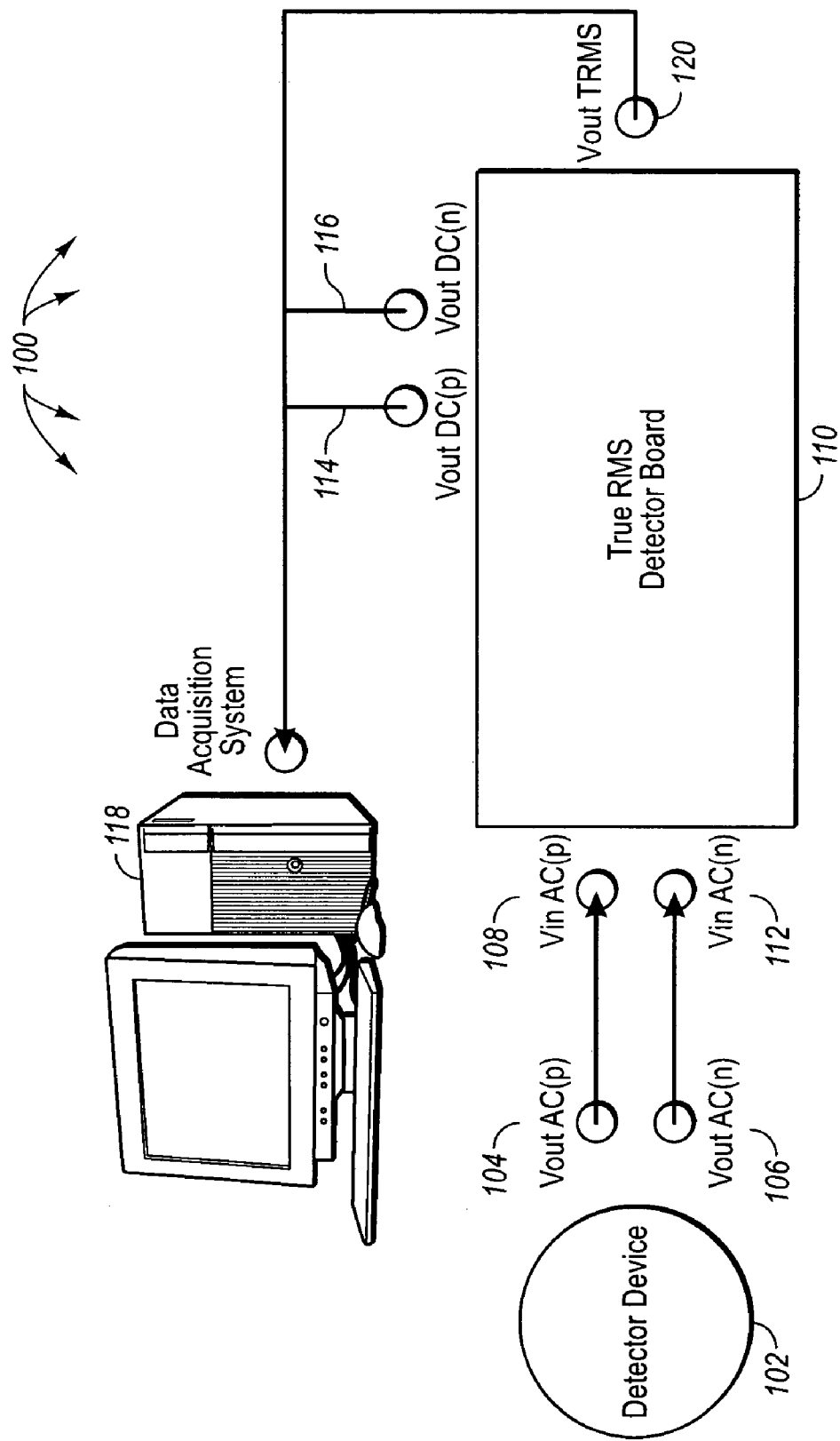
FIG. 1 illustrates a block diagram overview of a test apparatus for testing optical components.

Referring now FIG. 1, an embodiment is illustrated as a test apparatus 100 that provides for monitoring of AC and DC signals produced by a transmitter. The apparatus 100 shown in FIG. 1 may be used to test transmitter devices. In one example, the transmitter device may be a TOSA or a transmitter which includes a laser diode or light emitting diode (LED). The apparatus shown in FIG. 1 includes a detector device 102. The detector device 102 may be for example a detector that includes a photodiode coupled to a transimpedance amplifier with a differential output. The detector device 102 will be discussed in more detail with reference to FIG. 2 described herein. The detector device 102 outputs a positive output signal at a positive output signal terminal 104 and a negative output signal at a negative output terminal 106. The positive output signal is fed into a positive input port 108 of an RMS detector board 110. Similarly the negative output signal is input to a negative input port 112 of the RMS detector board 110. A true RMS converter test apparatus, which may be used as the RMS detector board 110, is described in more detail in U.S. patent application Ser. No. 11/103,766 titled "True RMS Converter Board" filed on Apr. 12, 2005 to the present inventor, which application is incorporated herein by reference.

The RMS detector board 110 includes circuitry for filtering DC components of the output signals from the AC components. The DC components of the signal are output at detector board DC output ports 114, 116. The DC output signals may be received by a data acquisition system 118 for use in characterizing the properties of a transmitter. For example, when generating an LIV curve for a laser, LED or other light source, the laser, LED or other light source is biased with a sweeping DC current and/or voltage that sweeps over a range of DC values. This causes the laser, LED or other light source to output certain amounts of optical power. This optical power may be converted by the detector device 102 to a current. The DC portion of this current may be output at the detector board DC output ports 114, 116. The value of the DC current at the detector board DC output ports 114, 116 is proportional to the optical output power of the laser, LED or other light source. Therefore, the signal output of the detector board DC output ports 114, 116 can be used to create an LIV plot.

The AC portions of the signals are converted to a function of the RMS value of the AC signals which is then fed to a RMS output port 120. The function of the RMS value of the AC signal may be received by the data acquisition system 118 and used in characterizing various characteristics of the transmitter. For example, if a laser, LED or other light source is only modulated using a DC source, the output at the RMS output port 120 represents a measure of AC noise produced by the laser, LED or other light source. Noise is one characteristic characterized for transmitter devices.

One embodiment may be used to test receiver devices by using a transmitter fixed as a portion of the test apparatus 100. In this example, the detector device 102 may be removable such that testing can be performed on numerous detector devices or receivers produced by a manufacturer.

Figure 2:
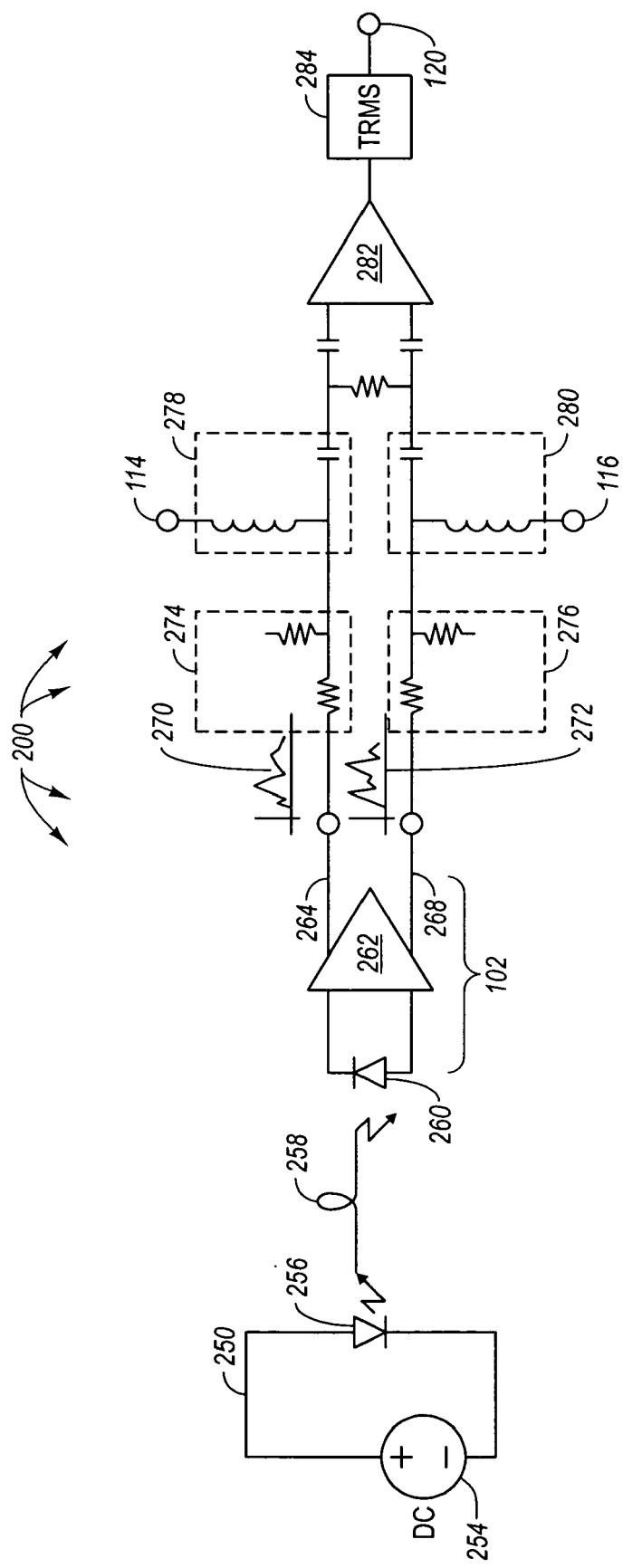
FIG. 2 illustrates a schematic drawing showing the general construction of a test apparatus for optical components.

Referring now to FIG. 2, a circuit diagram illustrates various features of one embodiment. FIG. 2 illustrates a transmitter source 250. The transmitter source 250 includes a DC supply 254. The DC supply 254 may be used to bias a laser diode or LED 256. In the example shown, the DC supply 254 may be a variable DC supply such that the current and voltage may be swept through different values.

When the test apparatus 200 shown in FIG. 2 is used for testing laser diodes and LEDs, the transmitter source 250 may be configured to couple to a transmitter such as an LED or laser diode. This configuration may include an appropriate test fixture that allows for quick removal and replacement of transmitters in the text test fixture. The LED or laser diode 256 may be optically coupled to a detector device 102. The optical coupling shown in FIG. 2 includes a path through a patch cord 258. This allows the optical signal produced by the laser diode or LED 256 to be transmitted to the detector device 102.

The detector device 102 includes a photo sensitive device such as a photodiode 260 and a transimpedance amplifier 262. The photodiode 260 converts optical signals received from the patch cord 258 to a small electrical current through the photodiode 260. In one embodiment the photodiode is a wide band, wide area optical detector suitable for capturing much of the power output from the laser diode or LED 256. This type of photodiode may be especially useful in noise measurement applications. The transimpedance amplifier 262 converts the small current through the photodiode 260 into a higher power differential electrical signal that is output as a differential signal on a positive output 264 and a negative output 268. The differential signal includes a positive differential signal 270 and a negative differential signal 272. The positive differential signal is fed to a first impedance matching network 274. The negative differential signal is sent to a second impedance matching network 276.

The first and second impedance matching networks 274, 276 may be configured to match the line characteristics from the output of the transimpedance amplifier 262. In one embodiment, the impedance matching networks 274, 276 are fabricated on a printed circuit board that includes various paths for receiving different values of components such as capacitors, resistors and inductors. Thus a printed circuit board can be customized for a particular test by stuffing the board with appropriately chosen components. Embodiments of the invention contemplate the use of several different kinds of matching networks. For example and not by way of limitation, a matching network may include specially designed printed circuit board traces that have a particular capacitance, inductance and/or resistance.

The matching networks may include fixed components such that the matching networks are fixed for a particular application or use. The matching networks may include switched components such that the matching network may be used for a plurality of different applications with minimal reconfiguration. The matching networks may comprise a variable filter for even further flexibility in designing tests apparatus. In one example the matching networks may include a digital signal processor (DSP) that functions as a filter. In some embodiments the first and second impedance matching networks 274, 276 are designed with similar or complementary printed Circuit Board layouts and components. This helps to ensure that the positive differential signal 270 and the negative differential signal 272 remain in phase with respect to each other. Alternatively, some embodiments may not include a matching network such as for some noise measurements where it is not necessary that signals are in phase.

The positive differential signal passes through the first impedance matching network 274 to a first filter 278. The first filter 278 separates AC and DC signals from the positive differential signal 270. The DC portions of the positive differential signal 270 are fed to a DC output 114. The negative differential signal 272 follows a similar path through the second impedance matching network 276 to a second filter 280 where the DC portion of the negative differential signal 272 is output at a DC output 116. The first and second filters 278, 280 may be in one example bias tees.

The AC output from the first and second filters 278, 280 is fed into an amplifier 282. The amplifier 282 in one embodiment is a high frequency amplifier with a wide bandwidth, low noise and other desirable characteristics. One example of an amplifier that may be used is the AD8129 available from Analog Devices. This particular amplifier functions at frequencies up to 250 MHz. The amplifier 282 is the differential amplifier that compares the positive AC signal and the negative AC signal and produces a difference of the two AC signals. This difference of the two AC signal is fed to a true RMS converter 284. Other embodiments may use amplifier useful at higher frequencies. In particular, with noise measurements, it may be useful to have an amplifier that is suitable for use at frequencies around 2.5 GHz.

The true RMS converter 284 converts the difference of the AC signals to a function of the RMS value of the difference of the AC signals. In one embodiment the true RMS converter 284 maybe part number AD8361 from analog devices. This particular true RMS converter outputs a signal that is generally 7.5 times the value of the RMS value of the difference of the AC signals. The function of the RMS value of the difference of the AC signals may vary slightly from the 7.5 value depending on the configuration of the true RMS converter 284. Alternate functions maybe readily obtained from the data sheet for this device which is available from analog devices on their website. As mentioned previously, the present embodiment shown is designed for operation between 1 KHz and 200 MHz.

However, other embodiments may be designed to function up to 2.5 gigahertz, such as in noise measurement and other applications, and beyond. When embodiments are designed for frequencies above 200 MHz, typically the embodiments will be designed for a range of frequencies so as to obtain the best results from of the true RMS converter 284. For example, it may be desirable to bias the true RMS converter 284 such that lower frequencies are less usable when the circuit is designed for higher frequencies. When constructing circuits for use above 200 MHz, an alternate amplifier 282 may be used that has a bandwidth suitable for use above 200 MHz.

Further, various filtering circuit may be used with multiple circuits such that an aggregate power value may be obtained. For example, it may be useful for one circuit and filter to measure higher frequencies, while a different circuit and filter are used to measure lower frequencies. Then the higher and lower frequency measurements are aggregated. This may provide a measurement of noise across a wider spectrum than if only a single filter and circuit were used.

In constructing the test apparatus 200 is desirable to construct the apparatus using a printed circuit board layout for certain portions of the circuits. It may also be desirable to ensure that traces on the printed circuit board are matched for positive and negative signal paths. If the traces are not matched for positive and negative signal paths, positive and negative signals may vary slightly in their phase from each other resulting an erroneous readings from the RMS converter 284. When constructing a noise measurement board, where phase is less important, the traces may not need to be as accurately controlled.

The apparatuses described herein should be calibrated when used as test equipment. However, using the components described herein the test apparatuses have been shown to be very accurate. Thus an automated calibration may be used where calibration equipment used in the automated calibration is calibrated so as to verify the accuracy of the automated calibration.

The terms high and low frequency, as described herein should be considered relative terms rather than applying to a specific standard of frequencies. Thus high-frequency as used herein is used to describe communications that use relatively high modulation rates as opposed to a specific range of frequencies as is used in some areas of the electronic and communication arts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A test apparatus for testing transmitter devices comprising:
 a transmitter source adapted to couple to an optical transmitter that is to be tested by the test apparatus;
 a wide band, wide area optical detector adapted to optically couple to the optical transmitter powered by the transmitter source;
 a filter coupled to the optical detector that is adapted to separate AC and DC portions of a signal received from the optical detector;
 a true RMS converter coupled to the filter that is adapted to convert an AC noise signal received from the filter to a function of an RMS value of the AC noise signal received from the optical detector; and
 a data acquisition system coupled to receive the function of the RMS value from the true RMS converter, wherein the data acquisition system is configured to use the function of the RMS value to characterize the noise characteristics of the optical transmitter.

2. The test apparatus of claim 1, wherein the transmitter source comprises a DC supply configured to bias the optical transmitter.

3. The test apparatus of claim 2, wherein the DC supply is a variable DC supply such that current and/or voltage may be swept through different values.

4. The test apparatus of claim 1, further comprising a test fixture coupled to the transmitter source that allows for quick removal and replacement of transmitters in the test fixture.

5. The test apparatus of claim 1, wherein the optical detector comprises a photodiode and a transimpedance amplifier.

6. The test apparatus of claim 5, wherein the transimpedance amplifier produces a differential signal.

7. The test apparatus of claim 5, further comprising an impedance matching network coupled to and configured to match the line characteristics of an output of the transimpedance amplifier, the impedance matching network being further coupled to the filter.

8. The test apparatus of claim 7, wherein the impedance matching network comprises specially designed printed circuit board traces that have a particular capacitance, inductance and/or resistance.

9. The test apparatus of claim 7, wherein the impedance matching network is implemented using digital signal processing.

10. The test apparatus of claim 7, wherein the impedance matching network comprises a positive path and a negative path, and wherein the positive path and negative path are complementary to reduce phase shifting.

11. The test apparatus of claim 1, further comprising a high frequency amplifier coupled to the filter and the true RMS converter.

12. The test apparatus of claim 1, wherein the true RMS converter is designed to operate within a range of frequencies.

13. The test apparatus of claim 1, wherein the data acquisition system is configured to characterize LIV characteristics of the optical transmitter by measuring a light intensity of the optical transmitter as a function of current and voltage used to drive the optical transmitter.

14. A method of testing transmitter devices, the method comprising:
    testing a transmitter device to determine one or more characteristics of the transmitter device, wherein testing the transmitter device comprises:
        supplying DC current or voltage to the transmitter device;
        detecting power output from the transmitter device;
        filtering AC and DC portions of a signal received as a result of detecting power output from the transmitter device;
        converting an AC noise signal received as a result of filtering to a function of an RMS value of the AC noise signal; and
        providing the function of the RMS value to a data acquisition system configured to characterize the noise characteristics of the transmitter device.

15. The method of claim 14, further comprising detecting a DC signal received as a result of detecting power output from the transmitter device.

16. The method of claim 14, further comprising sweeping the DC current or voltage to the transmitter device over a range of DC values to create an LIV plot that relates a light intensity of the transmitter device to the DC current or voltage supplied to the transmitter device.

17. A test apparatus for testing devices comprising:
    a test fixture adapted to removably receive an optical transmitter to optically couple the optical transmitter to an optical detector;
    a filter adapted to couple to the optical detector that is adapted to separate AC and DC portions of a signal received from the optical detector;
    a true RMS converter coupled to the filter that is adapted to convert an AC noise signal received from the filter to a function of an RMS value of the AC noise signal received from the optical detector; and
    a data acquisition system coupled to receive the function of the RMS value from the true RMS converter, wherein the data acquisition system is configured to use the function of the RMS value to characterize the noise characteristics of the optical transmitter.

18. The test apparatus of claim 17, further comprising a transimpedance amplifier adapted to couple to the optical detector.

19. The test apparatus of claim 17 wherein the test fixture allows for quick removal and replacement of transmitters in the test fixture.

20. The test apparatus of claim 1, further comprising a patch cord adapted to optically couple an optical signal from the optical transmitter to the optical detector.

* * * * *